Dec. 17, 1929.   F. SCHAEFER   1,739,990
BRAKE HANGER SUPPORT
Filed Jan. 5, 1927
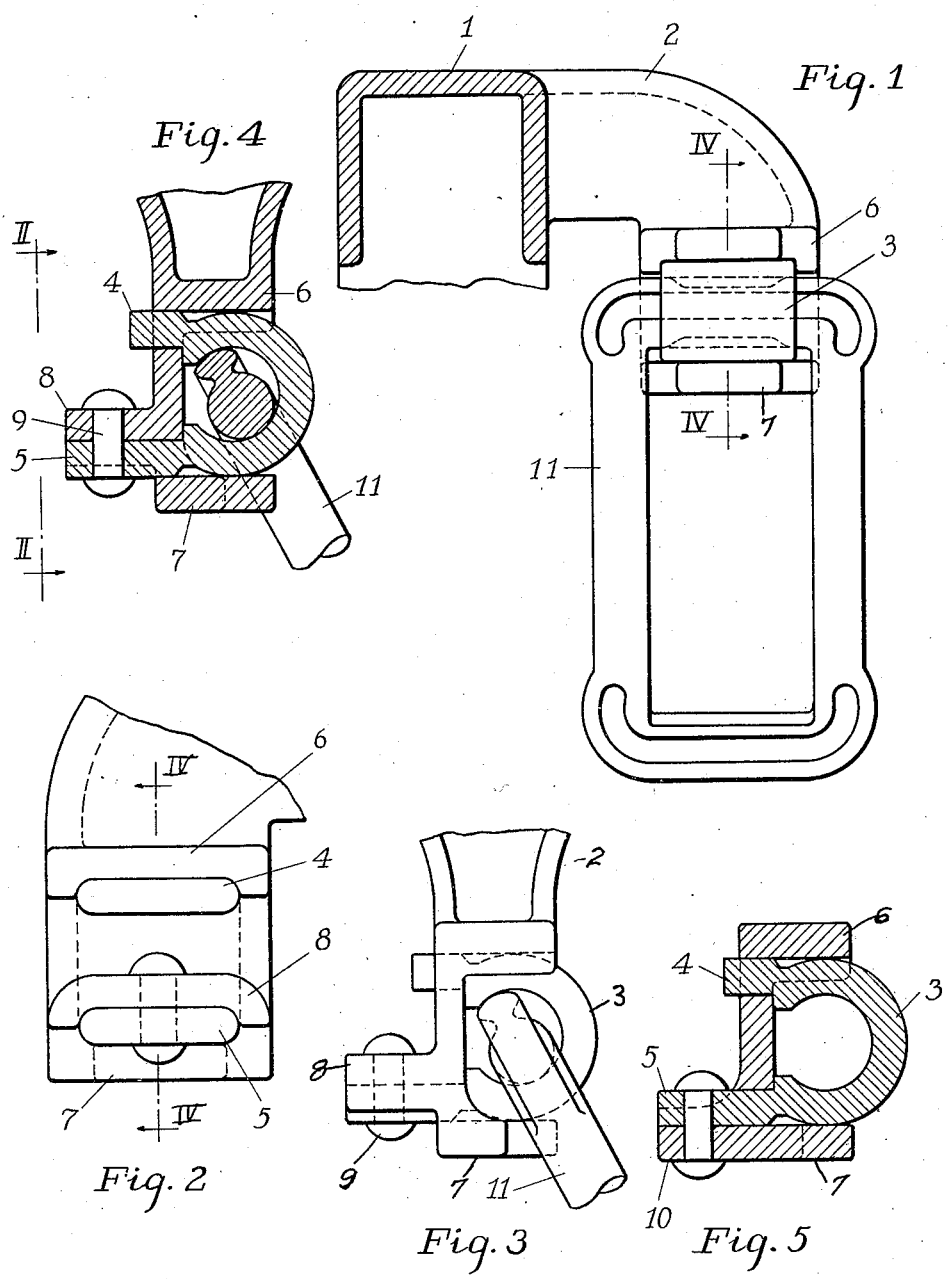
INVENTOR
Frederic Schaefer,
by Winter, Brown & Critchlow
his attorneys.

Patented Dec. 17, 1929

1,739,990

UNITED STATES PATENT OFFICE

FREDERIC SCHAEFER, OF PITTSBURGH, PENNSYLVANIA

BRAKE-HANGER SUPPORT

Application filed January 5, 1927. Serial No. 159,076.

The invention relates to attachments of brake hangers to the side frames of railway car trucks.

In my Patent No. 1,588,191 there is disclosed a brake hanger support comprising a stirrup forming a brake hanger bearing at its closed end and having its free ends arranged in a horizontally disposed opening formed in a bracket attached to a truck side frame. The free ends of the stirrup are of the same length, and a pin extends through both of them and through the bracket for attaching the stirrup to the bracket.

The object of this invention is to improve the type of brake hanger supports shown in my said patent to the end that a secure attachment of the stirrup to the brake hanger may be effected through but one of the legs of the stirrup.

The invention is illustrated in the accompanying drawing of which Fig. 1 is a transverse vertical section of the upper cord of a truck frame having a brake hanger supporting bracket attached to it which is shown in elevation together with a brake hanger; Fig. 2 an elevation of the rear side of the bracket, the plane of view being indicated by the line II—II, Fig. 4; Fig. 3 a side elevation of the support; Fig. 4 a sectional view taken on the lines IV—IV, Figs. 1 and 2; and Fig. 5 a sectional view corresponding to Fig. 4, of a modification of construction.

According to this invention a truck frame is provided with a laterally projecting bracket having a horizontally-disposed opening in which there is arranged a brake hanger supporting stirrup, one free end of which projects beyond the other for attaching the stirrup to the bracket. Preferably the bracket is provided with a connection plate overlying the projecting end of the stirrup for attaching it to the bracket, the connection plate and the projecting end of the stirrup being readily accessible for inserting a connecting pin or rivet through them.

Having reference to the illustrative embodiment of the invention, a truck frame 1 is shown as being provided at its side with a laterally extending bracket 2 formed at its lower end for receiving a brake hanger supporting stirrup. The stirrup preferably comprises a base or closed end 3 of cylindrical shape forming a bearing for a brake hanger, and having legs 4 and 5, the latter of which projects beyond the former. For receiving the stirrup the lower end of bracket 2 is provided with an opening formed between the upper and lower plates or webs 6 and 7. As shown particularly in Figs. 2 and 4 the bracket is provided with a connecting plate 8 overlying the projecting end 5 of the stirrup.

While the projecting end of the stirrup may be variously attached to connection plate 8, it is preferably attached to it by a rivet or rivets 9, the arrangement here being such that any downward pull upon the bearing portion 3 of the stirrup tending to raise its projecting end 5 is resisted by connection plate 8, rather than by the head of the attaching rivet. However, if desired, a connection plate 10 may be arranged below the projecting end of the stirrup, as illustrated in Fig. 5.

While the invention is applicable to various forms of either U-shaped or closed link brake hangers, it is particularly suitable for the latter. In the drawings there is shown a closed link or loop brake hanger 11 having its upper and lower transverse yokes or arms of a symmetric I-beam form as disclosed and claimed in my Patent No. 1,470,121. However, it will be understood that the invention is not limited to this particular form of brake hanger.

According to the provisions of the patent statutes, I have explained the principle and operation of my invention, and have illustrated what I now consider to represent its best embodiments. However, I desire to have it understood that, within the scope of the appended claims, the invention may be practiced otherwise than as specifically shown and described.

I claim as my invention:

1. The combination with a truck frame for railway cars provided with a bracket having a horizontally-disposed opening, a brake hanger stirrup arranged in said opening and having one of its free ends projecting beyond the other, said projecting end of the stirrup being riveted to a wall of said bracket.

2. The combination with a truck frame for railway cars provided with a horizontally-disposed opening, a brake hanger stirrup arranged in said opening and having one of its free ends projecting beyond the other, said bracket being provided with a connection plate adjacent to said projecting end of the stirrup, and means for attaching said projecting end of the stirrup to said plate.

3. The combination with a truck frame for railway cars provided with a horizontally-disposed opening, a brake hanger stirrup arranged in said opening and having one of its free ends projecting beyond the other, said bracket being provided with a connection plate overlying the said projecting end of the stirrup, and the projecting end of the stirrup being riveted to said plate.

In testimony whereof, I sign my name.

FREDERIC SCHAEFER.